United States Patent
Bewlay et al.

(10) Patent No.: US 6,203,752 B1
(45) Date of Patent: Mar. 20, 2001

(54) RHENIUM-COATED TUNGSTEN-BASED ALLOY AND COMPOSITE ARTICLES AND METHOD THEREFOR

(75) Inventors: Bernard Patrick Bewlay; Dennis Joseph Dalpe, both of Schenectady, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/572,397

(22) Filed: May 16, 2000

Related U.S. Application Data

(62) Division of application No. 09/204,230, filed on Dec. 3, 1998.

(51) Int. Cl.[7] .......................... B32B 15/01; B32B 15/02; B22F 7/02
(52) U.S. Cl. ................. 419/6; 428/665; 428/655
(58) Field of Search .......................... 419/6; 428/665, 428/655

(56) References Cited

U.S. PATENT DOCUMENTS

| | | |
|---|---|---|
| 3,780,418 | * 12/1973 | Hurst . |
| 4,612,162 | 9/1986 | Morgan et al. . |
| 4,657,822 | 4/1987 | Goldstein . |
| 4,726,927 | 2/1988 | Morgan et al. . |
| 5,041,041 | 8/1991 | Passmore et al. . |
| 5,056,209 | * 10/1991 | Ohashi et al. . |
| 5,376,329 | * 12/1994 | Morgan et al. . |

OTHER PUBLICATIONS

"Diffusion Layer at the Interface of W/Re–Composite Nozzles", by Yin Weihong et al., High Temperatures–High Pressures, 1994, vol. 26, pp. 115–121 (No Month).

* cited by examiner

Primary Examiner—Deborah Jones
Assistant Examiner—Jason Savage
(74) Attorney, Agent, or Firm—Robert P. Santandrea; Noreen C. Johnson

(57) ABSTRACT

A furnace component having a tungsten-based substrate whose surface is protected by a rhenium-based layer in order to render the component less reactive to quartz, glass and other forms of silica. The layer preferably consists essentially of rhenium or rhenium with alloying additions of tungsten. The substrate may be formed of concentric layers of different tungsten-based alloys in order to tailor the physical and mechanical properties of the component. A preferred method of forming the rhenium layer is to wrap the substrate with a rhenium-based wire, and then heat the wire and substrate to sinter and bond the wire to the substrate. Alternatively, the substrate and rhenium layer can be formed by isostatic pressing. Both methods are performed so that the substrate and layer have densities of at least about 96% of their respective theoretical densities.

21 Claims, 4 Drawing Sheets

RHENIUM-COATED TUNGSTEN-BASED ALLOY AND COMPOSITE ARTICLES AND METHOD THEREFOR

This application is a division of application Ser. No. 09/204,230, filed Dec. 3, 1998, which is hereby incorporated by reference in its entirety.

The present invention relates to coatings for tungsten-based articles. More particularly, this invention relates to rhenium coatings for tungsten-based alloy and composite articles such as tungsten alloy nozzles for drawing and extruding quartz, glass and other silica-based materials, and processes for forming rhenium-containing coatings on such articles.

BACKGROUND OF THE INVENTION

Quartz, glass and other silica-based materials are often processed in the form of rods and tubes by heating the material in a furnace and then drawing or extruding the material through a die or orifice. Because of its high temperature strength and creep resistance, tungsten has been used to form the furnace structure and components that contact silica-based materials during processing, including drawing dies and extrusion nozzles. However, tungsten tends to react with silica, generating undesirable tungsten-based inclusions and defects in the processed material, as well as leading to degradation of the tungsten-based component. Defects in materials generated by reactions with tungsten are highly undesirable for many quartz applications, particularly in the semiconductor and lamp industries. The reactivity of tungsten with silica also reduces the service life of the tungsten components.

In response, the prior art has used rhenium to protect tungsten nozzles on the basis that rhenium is less reactive with silica than tungsten. An existing method has been to form a rhenium tube by producing a blank of 90% theoretical density using a powder metallurgy (PM) process. The blank is then rolled to form a tube that can be inserted into an appropriately sized bore formed in a PM tungsten nozzle that was pre-sintered to near 100% density. After installation, the rhenium tube is diffusion bonded to the tungsten nozzle.

While being less reactive to silica-containing materials, rhenium tubes produced and installed in the manner described above are prone to cracking during use of the tungsten nozzles at high service temperatures. Accordingly, it would be desirable if improved components were available for use in the processing of silica-based products.

BRIEF SUMMARY OF THE INVENTION

According to the present invention, a component having a tungsten-based substrate is provided whose surface is protected by a rhenium-based layer in order to render the component less reactive to quartz, glass and other forms of silica. The layer preferably consists essentially of rhenium or rhenium with alloying additions of tungsten. The substrate may be formed of concentric layers of different tungsten-based alloys or composites in order to tailor the physical and mechanical properties of the component. The rhenium layer and tungsten substrate of this invention have densities of at least 96% of theoretical, and preferably very near 100% of theoretical. Rhenium layer densities of at least 96% are preferred for this invention based on the determination that rhenium tubes of the prior art (with densities of less than 96%) were cracking as a result of the tubes continuing to sinter at high temperatures during use of the component in which they were installed. It was learned that sintering of a rhenium tube within a fully dense tungsten body caused the tube to further densify, which generated tensile stresses within the tube that led to cracking. Therefore, this invention produces a fully-sintered and dense rhenium layer on a fully-sintered and dense tungsten substrate.

In one embodiment, the rhenium layer and tungsten substrate are formed by simultaneously isostatically pressing and sintering rhenium and tungsten powders. In another embodiment the rhenium layer and tungsten substrate are formd by isostatically pressing a rhenium powder to form a rhenium preform and then isostatically pressing and sintering a tungsten powder around the rhenium preform so that the preform is a protective PM layer on a PM tungsten article. In this manner, the rhenium layer can be fully sintered to at least 96% theoretical density, and therefor much less prone to cracking when the component is exposed to high temperatures.

According to this invention, a typical bond between the rhenium layer and tungsten substrate is characterized by a reduced contact area—that is, the contact area between the layer and substrate is significantly less than the surface area of the substrate covered by the layer. A notable advantage of this bond interface is that interdiffusion between the rhenium layer and tungsten substrate is greatly reduced, so that the formation of brittle tungsten-rhenium intermetallics is inhibited. A typical method for producing a component of this type is to contact a tungsten-based substrate with a rhenium-based wire, and then heat the wire and substrate to sinter and bond the wire to the substrate. By this process, the resulting rhenium layer generally retains the macrostructure of the wire, such that the layer is segmented with distinct cross-sections corresponding in shape to the rhenium-based wire, with each cross-section being individually bonded to the substrate. A general advantage of this method of forming the rhenium layer is substantially lower processing costs as compared to more conventional methods, such as plasma spraying, physical vapor deposition (PVD), chemical vapor deposition (CVD) and electroplating. Other advantages of this invention include the ability to precisely control the thickness of the rhenium layer by appropriately sizing the wire, and the ability to selectively apply the wire to form the rhenium layer at only those locations requiring a protective coating. The resulting rhenium layer is also sufficiently machinable to enable all or part of it to be removed during subsequent fabrication or repair of the component.

Other advantages of this invention will be better appreciated from the following detailed description.

DETAILED DESCRIPTION OF THE INVENTION

Figure 1:
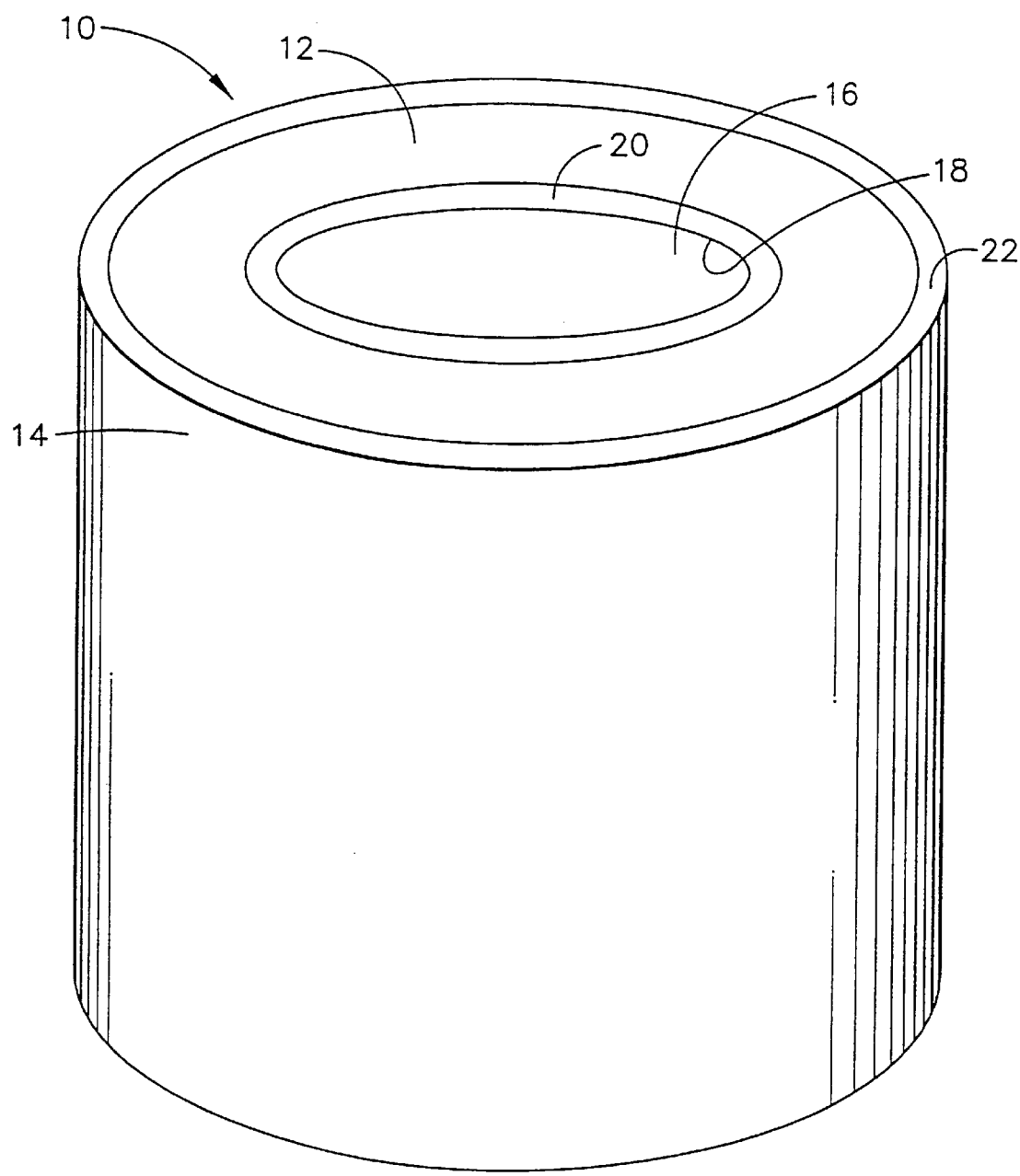
FIG. 1 is a perspective view of a nozzle for extruding quartz and having a tungsten-based substrate with a rhenium-based coating in accordance with this invention.

The present invention provides a component of the type used with high temperature furnaces for processing quartz, glass and other forms of fused silica. An example is an axisymmetric extrusion nozzle 10 represented in FIG. 1 as having a generally tubular-shaped core 12, a cylindrical external surface 14, and an orifice 16 defining a cylindrical internal surface 18. A quartz rod product can be drawn through the orifice 16. Alternatively a quartz tube product can be extruded through the orifice 16 and around a mandrel (not shown) positioned within the orifice 16.

The core 12 of the nozzle 10 is formed of tungsten or a tungsten-based alloy or composite, while the cylindrical interior and exterior surfaces of the core 12 are protected by inner and outer layers 20 and 22, respectively, of rhenium or a rhenium alloy or composite. The rhenium-contianing layers 20 and 22 serve as protective coatings for the nozzle 10 to prevent reaction between the tungsten-based core 12 and quartz being processed through the nozzle 10. While commercially pure rhenium can be used for the layers 20 and 22, rhenium containing up to about 11 weight percent tungsten (near the solubility limit of tungsten in rhenium) may be used to reduce costs, though a disadvantage is a higher reactivity with silica. The core 12 is preferably formed by powder metallurgy, by which tungsten or a tungsten alloy powder is consolidated and sintered to 100% of theoretical density. An example of a suitable tungsten alloy contains up to 27 weight percent rhenium (near the solubility limit of rhenium in tungsten), the balance essentially tungsten and incidental impurities. Though the coefficient of thermal expansion of rhenium is lower than tungsten, rhenium is sufficiently more ductile than tungsten to accommodate tensile stresses that may be generated in the layers 20 and 22 during processing and service, so that the layers 20 and 22 can be resistant to cracking.

Figure 2:
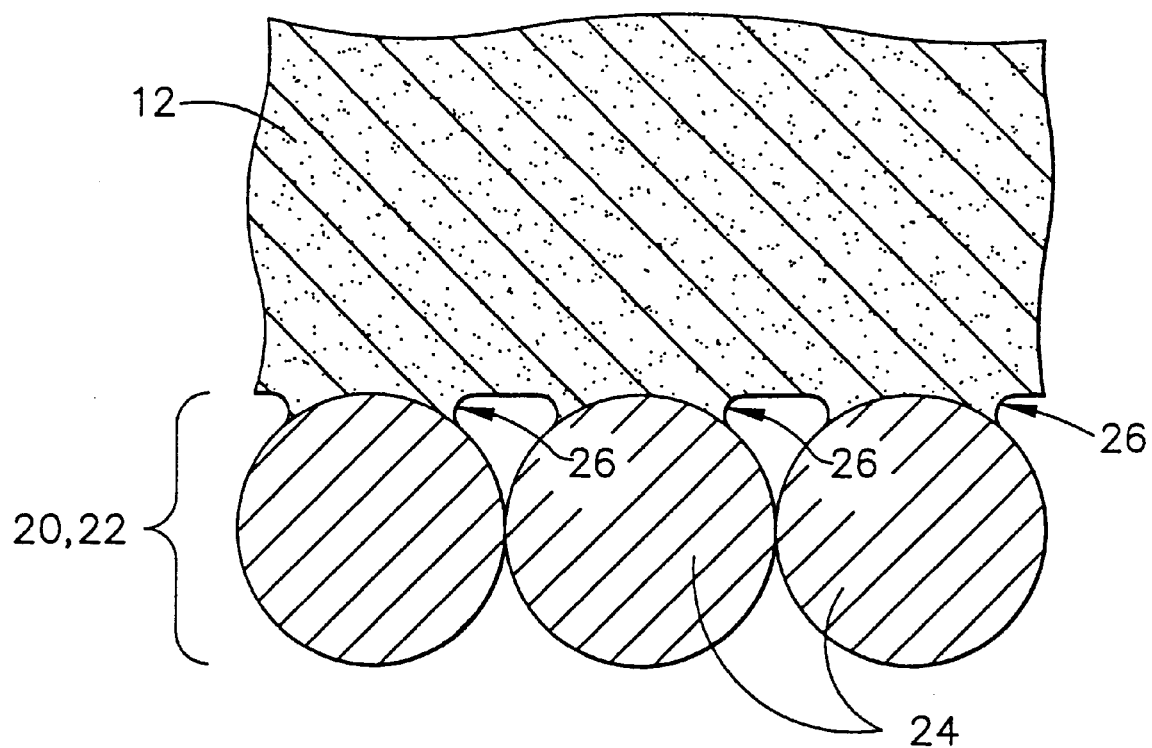
FIG. 2 represents a magnified cross-sectional view of the nozzle of FIG. 1 and showing the rhenium-based coating as being formed by a rhenium-based wire bonded to the tungsten-based substrate.

FIG. 2 represents a typical structure for the rhenium layers 20 and 22 achieved by the bonding of circular cross-section rhenium-based wire to the core 12. As shown, the resulting rhenium layers 20 and 22 are characterized by circular segments 24 that have generally retained the cross-sectional shape of the wire. Each segment 24 is individually bonded to the core 12 by a neck formation 26, such that the contact area between the core 12 and the layers 20 and 22 is much less (e.g., less than half as shown) of the entire surface of the core 12 covered by the layers 20 and 22. A significant advantage of this aspect of the invention is that less interdiffusion occurs between the tungsten-based core 12 and the rhenium-based layers 20 and 22 during coating and subsequent high-temperature exposures. This less interdiffusion minimizes the formation of undesirable brittle W-Re intermetallics, such as, but not limited to, sigma ($\sigma$) and chi ($\chi$) intermetallics, that could lead to spallation of the layers 20 and 22. The amount of interdiffusion that will occur between the core 12 and the layers 20 and 22 is determined by the cross-sectional area of the neck formation 26, which can be controlled by the diameter of the wire, the cross-sectional shape of the wire (e.g., circular, triangular or rectangular), and the temperature and duration of the heat treatment used to bond the wire to the core 12.

In accordance with the embodiment of FIG. 2, rhenium-based wire (rhenium or a rhenium composite or rhenium alloy containing up to 11 weight percent tungsten) is tightly and closely wound onto the exterior or interior surfaces or both the exteriorand interior surfaces of the core 12 to achieve a mechanical bond with the core 12. Typically, each wire turn intimately contacts the adjacent wire turn and the core 12. One or more layers of wire can be simultaneously built up on the interior and exterior surfaces of the core 12 by winding the wire from the inside to the outside of the core 12 in longitudinal loops parallel to the symmetry axis of the core 12. Alternatively, wire can be wound onto the core exterior with circumferential loops approximately perpendicular to the symmetry axis of the core 12, and wire can be prewound and inserted into the interior of the core 12. For the core interior, wire is typically wound on a mandrel (not shown) and then installed in the core 12 as a coil in much the same manner as a helical wire insert of the type used with threaded fasteners. The mandrel typically has a diameter slightly larger than the core interior so that, following insertion by winding the wire coil up slightly, the wire is secured by a compressive load that promotes contact with the core 12. The bore of the core 12 can be threaded to match the pitch of the wire coil. The wire can be applied to uniformly and completely cover the interior and exterior surfaces of the core 12. Alternatively, the wire can be applied at different axial locations along the length of the core 12 to produce a rhenium layer only at selected locations. For example, wire could be applied to only one axial end of the core 12 that in service will be subjected to higher temperatures due to a temperature profile within the component 12. Selective placement of rhenium layers on a component also reduces material costs in view of the expense of rhenium.

Following application of the wire to the core 12, the core and wire assembly undergoes a heat treatment to sinter the rhenium wire turns together to generate an integral coating and atomically bond the wire to the tungsten core 12. A minimum heat treatment temperature is about 1800° C., with a more typical range being about 2300° C. to about 2800°C., the upper limit of which is below the eutectic temperature of rhenium and tungsten and therefore prevents melting. The rhenium layer 20/22 represented in FIG. 2 was formed by about 0.030 inch (about 0.75 mm) diameter rhenium wire heat treated at a temperature of about 2700° C. for about four hours, which produced the desirable bond structure between the wire and core 12 depicted in FIG. 2.

From FIG. 2, it can be appreciated that the thickness of the layers 20 and 22 can be tailored by the diameter of the wire used, as well as by applying multiple layers of wire. Generally, layer thicknesses of as thin as 50 Fm and as thick as several millimeters can be produced with the technique described above. Following heat treatment, the rhenium layers 20 and 22 may be further consolidated to full density (at least about 96% of theoretical density) by hot isostatic pressing. The rhenium layers 20 and 22 may also be machined, ground or polished to improve their surface finish after heat treatment.

Figure 3:
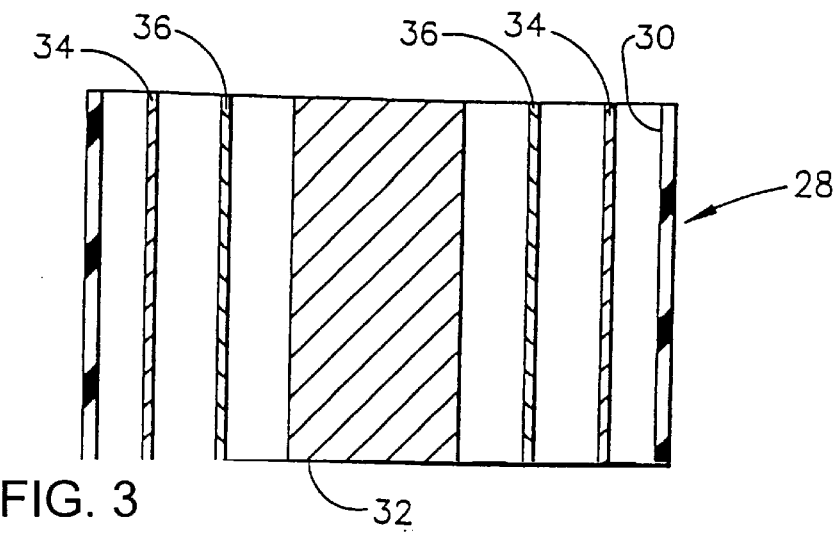
FIGS. 3 through 5 and 6 through 7 are cross-sectional views depicting depict alternative processes for forming the tungsten-based substrate and the rhenium-based coating.
Figure 4:
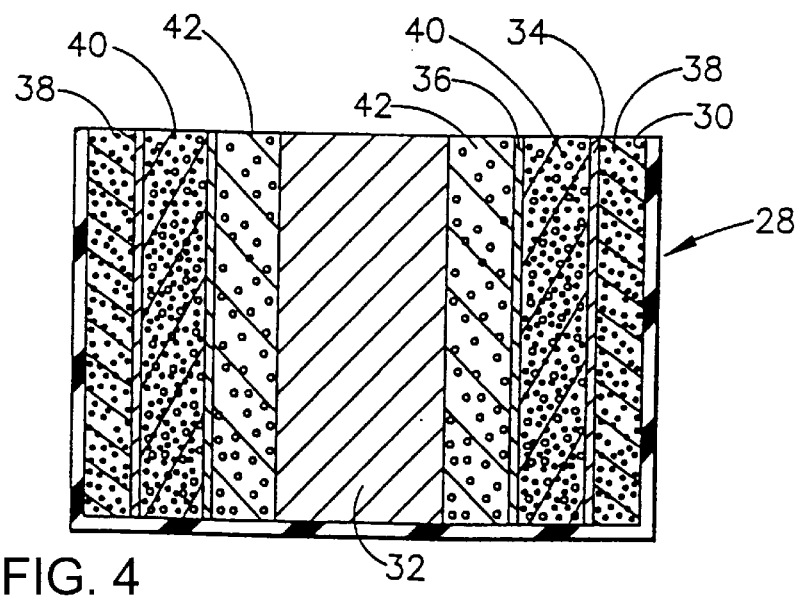
Figure 5:
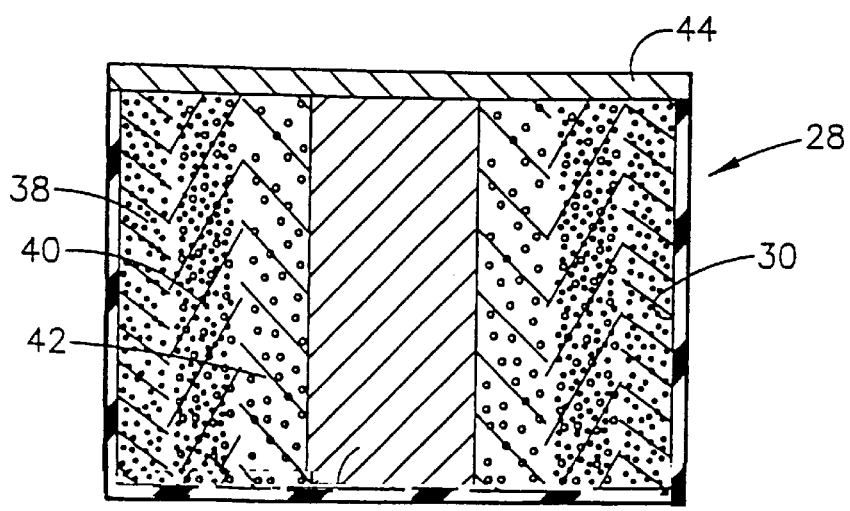

Alternative embodiments for producing the rhenium layers 20 and 22 on the tungsten core 12 are described below in reference to FIGS. 3 through 8. In FIGS. 3 through 5, a process is shown that simultaneously forms the core 12 and the rhenium layer 20 by powder metallurgy using cold isostatic pressing techniques. In FIG. 3, a flexible mold 28 is formed of urethane or another suitable material to define a cavity 30 in which the desired powders for the core 12 and layer 20 will be deposited. Centrally positioned within the cavity 30 is a mandrel 32, around which two annular partitions 34 and 36 are positioned to define three concentric annular-shaped cavities. In one embodiment, the partitions 34 and 36 are solid wall sections that are removed prior to consolidation of the powders. To minimize intermixing of the powders, the partitions 34 and 36 are typically thin-walled to minimize the volume change that occurs when the partitions 34 and 36 are subsequently removed. Also to minimize intermixing, the partitions 34 and 36 may comprise polished surfaces to reduce friction with the powders as the partitions 34 and 36 are removed. Alternatively, the partitions 34 and 36 can be formed of a tungsten or rhenium mesh, enabling the partitions 34 and 36 to be left in place to become part of the core 12 upon consolidation and sintering of the powders.

In FIG. 4, the outermost annular cavity is filled with a tungsten powder 38, the middle cavity is filled with a tungsten-rhenium alloy powder 40, and the innermost cavity is filled with a rhenium powder 42. A suitable mean particle size for the powders 38, 40 and 42 is less than about 4.5 Fm. The tungsten-rhenium alloy powder 40 provides a transition between the tungsten core 12 and the rhenium layer 20, and reduces differences in thermal expansion coefficients and provides a reduction in thermal stresses that can be generated in thermal cycling. In FIG. 5, a mold cap 44 has been placed on the mold 28 to seal the mold 28 and sufficient pressure has been applied to compact the powders 38, 40 and 42. As noted above, the partitions 34 and 36 are removed before sealing and compaction. Alternatively, the partitions 34 and 36 can be formed of tungsten or rhenium mesh and compacted with the powders 38, 40 and 42. A typical consolidation process is wet-bag cold isostatic pressing at a pressure of up to about 280 MPa (about 40 ksi), in which the entire mold 28 is placed in a hydrostatic vessel filled with a hydraulic fluid, for example water, that is pressurized to compact the mold 28 and powders 38, 40 and 42 at room temperature, as known in the art. An alternative method is dry-bag isostatic pressing, which is also known to those skilled in the art. After consolidation, the resulting article is removed from the mold 28 and furnace presintered at a temperature of about 1000° C. to about 1400° C., machined to acquire the desired shape and dimensions for the article, and then sintered at a temperature of up to about 2450° C., preferably about 1800° C. to about 2200° C., to attain a density of at least about 96%.

Figure 6:
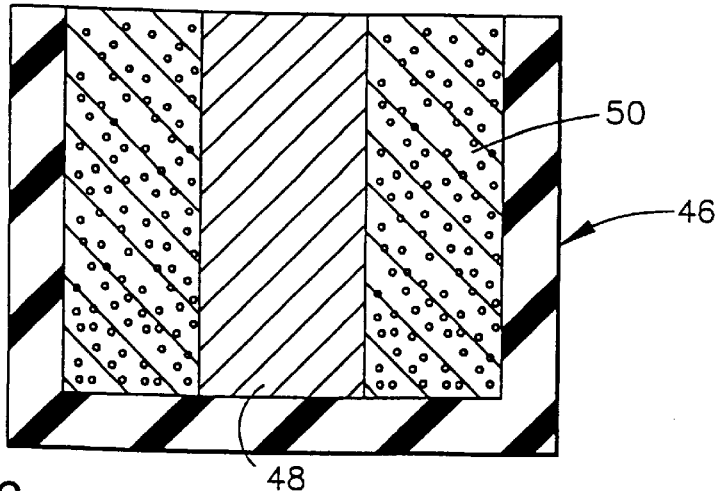
Figure 7:
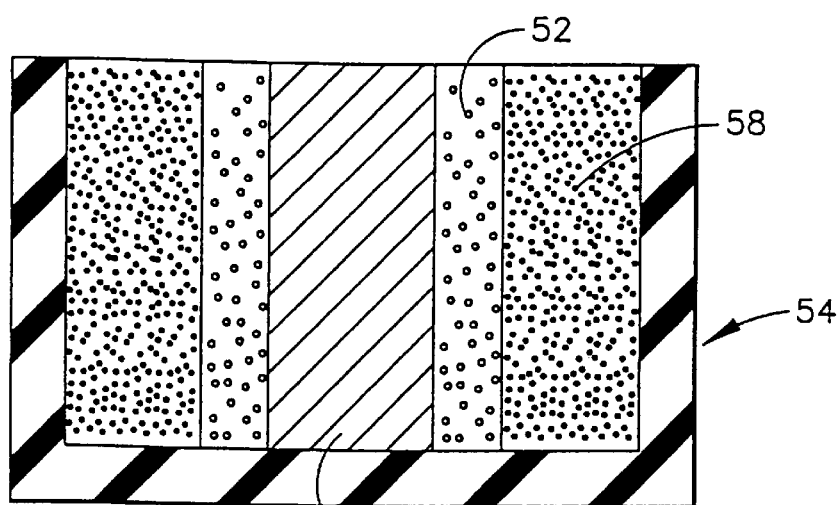

In FIGS. 6 and 7, rhenium powder 50 is first consolidated in a flexible mold 46 with a central mandrel 48 at pressures up to about 210 MPa (about 30 ksi). The pressed rhenium article 52 and mandrel 48 are then placed in a larger diameter mold 54. The gap between the pressed rhenium article 52 and the outer wall of the mold 54 is filled with a tungsten or tungsten alloy powder 58. The diameters of the molds 46 and 54 are sized to accommodate the powder compaction ratios for the individual powders 50 and 58. The second pressing operation (performed in the mold 54) must be performed at an equal or higher pressing pressure than that performed in the mold 46 to effect mechanical bonding of the tungsten powder 58 to the rhenium article 52. For this purpose, dry-bag cold isostatic pressing is believed to be preferred for both pressing operations to preserve the length of the rhenium article 52 during consolidation of the tungsten powder 58. The length of the rhenium article 52 would be difficult to maintain using wet-bag pressing due to the axial compaction that would occur, with the result that area fraction and spatial distribution of the powders 50 and 58 would be difficult to control, and the article 52 would be susceptible to being broken during the final pressing in the mold 54.

Following consolidation, the resulting rhenium-coated tungsten article is presintered, machined, and then sintered in a high temperature furnace at a temperature of up to about 2450° C. The article achieves the desired final dimensions and a density of at least about 96% of theoretical.

Figure 8:
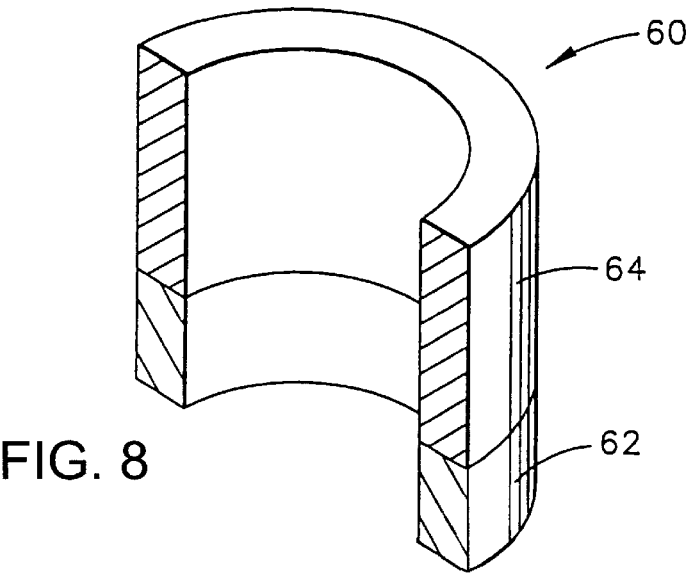
FIG. 8 is a perspective view of an alternative configuration for a nozzle with axial layers of tungsten and rhenium.

FIG. 8 illustrats an alternative embodiment for a nozzle 60 for drawing or extruding quartz, in which tungsten and rhenium layers 62 and 64 are located axially instead of radially to each other. The nozzle 60 can be formed in a mold similar to that in FIG. 6. The mold cavity is partially filled with a tungsten-based alloy powder, then filled with a rhenium-based alloy powder, compacted and sintered. This configuration is advantageous if the temperature profile within the nozzle 60 requires the presence of rhenium only within a limited region of the nozzle 60. The axial thickness of the rhenium layer 64 may be as little as about 30 Fm or as thick as several centimeters using the processing methods of this invention. A nozzle 60 with tungsten and rhenium layers 62 and 64 as shown in FIG. 8, or with additional layers of tungsten or rhenium or thungsten and rhenium, can have aspect ratios (length:diameter) of up to twenty or more.

While the invention has been described in terms of a preferred embodiment, it is apparent that other forms could be adopted by one skilled in the art. Therefore, the scope of the invention is to be limited only by the following claims.

What is claimed is:

1. A method of forming a rhenium-based layer on a tubular-shaped component that contacts a silica-containing material, the method comprising the step of forming a rhenium-based layer on a surface of a tungsten-based substrate, the layer and the substrate having densities of at least about 96% of their respective theoretical densities.

2. A method as recited in claim 1, wherein the substrate is formed to be axisymmetric.

3. A method as recited in claim 1, wherein the substrate comprises tungsten and up to about 27 weight percent rhenium.

4. A method as recited in claim 1, wherein the layer comprises rhenium and up to about 11 weight percent tungsten.

5. A method as recited in claim 1, wherein the substrate is formed to comprise concentric layers of different tungsten-based alloys.

6. A method as recited in claim 1, wherein the step of forming the rhenium-based layer comprises contacting the surface of the substrate with a rhenium wire, and then heating the wire and substrate to bond and sinter the wire to the substrate.

7. A method as recited in claim 6, wherein the wire is wrapped around the substrate so as to contact an exterior surface thereof.

8. A method as recited in claim 6, wherein the wire is formed into a coil and inserted into the substrate so as to contact an interior surface thereof.

9. A method as recited in claim 6, wherein the heating step forms a bond between the layer and the substrate, the bond comprising a contact area that is less than the surface area of the substrate covered by the layer.

10. A method as recited in claim 6 wherein, after the heating step, the layer is segmented with distinct cross-sections corresponding in shape to the rhenium-based wire, the cross-sections being individually bonded to the substrate.

11. A method as recited in claim 1, wherein the substrate and the layer are formed by the steps of:
providing a mold having an outer wall defining a mold cavity;
placing a mandrel centrally within the mold cavity;
positioning a tubular-shaped partition in the mold cavity and around the mandrel so as to define an outer cavity between the partition and the outer wall of the mold and an inner cavity between the partition and the mandrel;
filling one of the inner and outer cavities with a tungsten-based powder and filling the other of the inner and outer cavities with a rhenium-based powder;
removing the partition; and then compacting and sintering the powders to form the component.

12. A method as recited in claim 1, wherein the substrate and layer are formed by the steps of:
   providing a mold having an outer wall defining a mold cavity;
   placing a mandrel centrally within the mold cavity;
   positioning a tubular-shaped rhenium or tungsten-based partition in the mold cavity and around the mandrel so as to define an outer cavity between the partition and the outer wall of the mold and an inner cavity between the partition and the mandrel;
   filling one of the inner and outer cavities with a tungsten-based powder and filling the other of the inner and outer cavities with a rhenium-based powder; and then
   compacting and sintering the powders and the partition to form the component.

13. A method as recited in claim 1, wherein the substrate and layer are formed by the steps of:
   providing a first mold having an outer wall defining a first mold cavity;
   placing a mandrel centrally within the first mold cavity;
   filling the first mold cavity with a rhenium-based powder;
   compacting and sintering the rhenium-based powder to form an annular-shaped subcomponent;
   removing the subcomponent from the first mold cavity and positioning the subcomponent in a mold cavity of a second mold so as to define an outer cavity between the subcomponent and an outer wall of the second mold;
   filling the outer cavity with a tungsten-based powder; and
   compacting and sintering the tungsten-based powder and diffusion bonding the tungsten-based powder to the subcomponent to form the component.

14. A method as recited in claim 1, wherein the substrate and layer are formed by the steps of:
   providing a mold having an outer wall defining a mold cavity;
   placing a mandrel centrally within the mold cavity;
   partially filling the mold cavity with a tungsten-based powder;
   further filling the mold cavity with a rhenium-based powder; and then
   compacting and sintering the powders to form the component.

15. A method as recited in claim 1, wherein the component is chosen from the group consisting of drawing dies and extrusion nozzles for forming silica-based rod and tubes, respectively.

16. A method of forming a rhenium-based layer on a tungsten-based substrate wherein the layer and the substrate have densities of at least about 96% of their respective theoretical densities, the method comprising the steps of:
   forming the tungsten-based substrate;
   placing a rhenium-based wire in contact with a surface of the substrate; and then
   heating the wire and substrate to sinter and bond the wire to the substrate.

17. A method as recited in claim 16, wherein the wire is wrapped around the substrate so as to contact an exterior surface thereof.

18. A method as recited in claim 16, wherein the wire is formed into a coil and inserted into an opening in the substrate so as to contact an interior surface of the substrate.

19. A method as recited in claim 16, wherein the heating step forms a bond between the layer and the substrate, the bond comprising a contact area that is less than the surface area of the substrate covered by the layer.

20. A method as recited in claim 16, wherein, after the heating step, the layer is segmented with distinct cross-sections corresponding in shape to the rhenium-based wire, the cross-sections being individually bonded to the substrate.

21. A method as recited in claim 1, wherein the tubular-shaped component comprises a generally tubular-shaped, hollow, cylindrically-shaped member, the cylindrically-shaped member comprising a hollow passage therethrough, the hollow passage and the cylindrically shaped member defining inner and outer surfaces, the step of forming the rhenium-based layer comprises:
   disposing the layer on at least one of the inner and outer surfaces defined by the hollow passage and the cylindrically shaped member.

* * * * *